Figure 1:
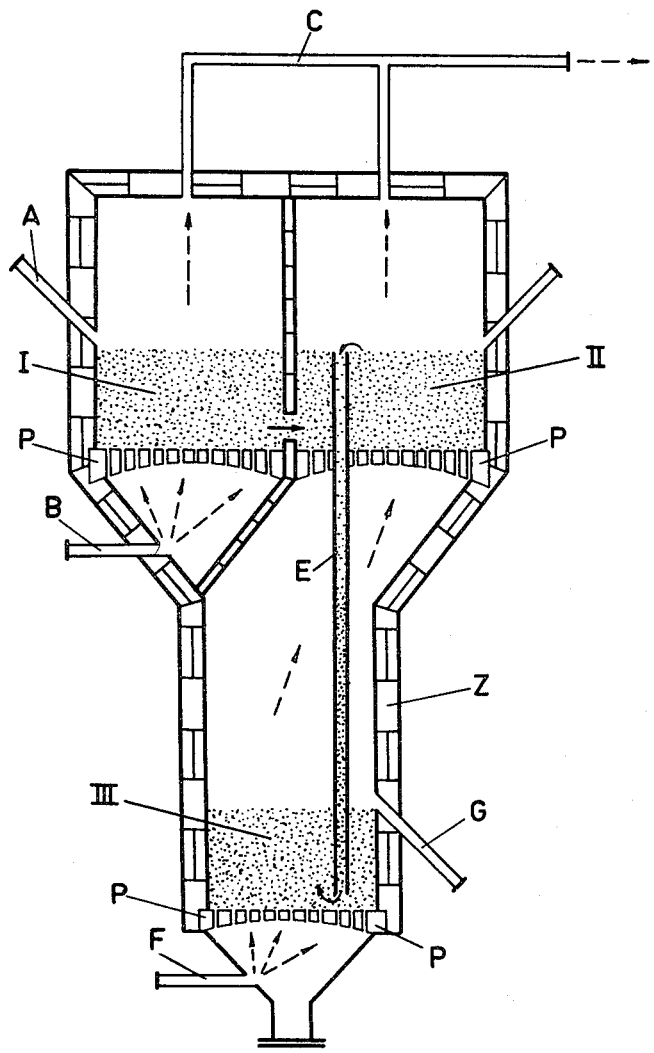

March 9, 1965

A. VIAN-ORTUNO ETAL 3,172,755

PROCESS FOR THE TREATMENT OF PYRITE ORES BEARING ARSENIC AND LEAD

Filed Dec. 22, 1960

2 Sheets-Sheet 1

INVENTORS
Angel Vian-Ortuno
Conrado Iriarte-Fernande
BY Angel Roivero-Gonzalez

Michael J. Striker
ATTORNEY

United States Patent Office 3,172,755
Patented Mar. 9, 1965

3,172,755
PROCESS FOR THE TREATMENT OF PYRITE ORES BEARING ARSENIC AND LEAD
Angel Vian-Ortuno, Conrado Iriarte-Fernandez, and Angel Romero-Gonzalez, Madrid, Spain, assignors to Instituto Nacional de Industria, Madrid, Spain
Filed Dec. 22, 1960, Ser. No. 79,944
Claims priority, application Spain, Apr. 23, 1957, 234,996
6 Claims. (Cl. 75—9)

The present invention relates to a process for the treatment of pyrite ores bearing arsenic and lead, and is a continuation-in-part of our copending application Serial No. 729,129, filed April 17, 1958.

The making use of pyrites cinders in iron-and-steel industry is known to be a difficult matter due to the presence of arsenic, lead, copper and zinc therein. Not any among the conventional methods enables the exhaustive and direct treatment of pyrites bearing such elements, by roasting the same. Such an exhaustive treatment requires the following:

(a) The production of sulphur dioxide with an adequate yield of sulphur.

(b) The production of cinders suitable for use in iron-and-steel industry.

(c) An adequate use of the heat developed in the roasting stage.

(d) An easy recovery of both copper and zinc, these elements rendering (b) impossible when they are not present in amount sufficient for their thorough lixiviation in an economical manner.

As it is well known, both, stage-furnaces and rotary kilns, are unsuitable so that the so-called turbulence furnaces or fluidized bed furnaces have gradually acquired an increasing importance in the roasting of pyrites. However, arsenic-bearing pyrites do not comply with condition (b) because of the retention of arsenic in the cinders. That is why several very diverse methods have been registered for the distilling of the arsenic prior to the turbulent roasting of pyrites, or subsequent to it.

The technological problem of treating the cinders becomes still more difficult when the ores also contain lead, as is usual in many cases, in which cases particular de-arsenication methods as well as a subsequent removal of lead must be carried out.

We have minutely investigated the mechanism by which the combination of the arsenic takes place in fluidized beds and, as a result, we know that although the distillation of the arsenic from the newly arrived grains in the furnace takes place in form of the volatile compounds $As_2S_2$ and/or $As_2O_3$, these compounds further combine with the previously dearsenicated and oxidized grains in the bed ($Fe_2O_3$) which are lying for a longer time in the bed into which air or oxygen is continuously fed to make roasting possible. Thus, a strongly arsenical compound is produced which is iron arsenate. Analogically, lead can be removed in the form of a sulphide but not in the strong forms of oxide or sulphate, which can be formed according to the operating conditions.

As a result, the combination implicates an oxidation ($As_2O_5$ or PbO), the oxidizing agent not only being oxygen, but also iron oxide.

These difficulties may be partially overcome by the two following conventional types of methods:

(a) Overlapped beds, through which pyrites are flowing downwards, whereas the comburent agent and the roasting gases are flowing upwards passing through all beds containing pyrite or pyrites transformation products.

(b) Adjacent beds (two, generally) provided with independent air inlets for each bed and also with independent gas outlets; a smaller air stream than that stoichiometrically necessary facilitates arsenic removal in the first bed, and the relatively de-arsenicated solids in this first bed are wholly roasted with an excess of air in the second bed.

The methods shown under (a) are physically troublesome because of the high pressure drop of the gases, and, furthermore, because their working at higher temperatures than 700° C. is necessary in the 1st stage (de-arsenication stage) when the initial arsenic content is high, this involving the distillation of a great part of the labile sulphur. Due to the fact that such a distillation presents all the characteristics of a change of state equilibrium, the temperature remains unalterable, so that the total removal of the arsenic becomes too slow and, besides, the burning of the distilled sulphur separately from the roasting itself is a difficult matter.

The methods shown under (b) intend only the burning out of the labile sulphur from pyrites in the 1st bed. But, in such conditions, neither a fast nor a complete removal of the arsenic is obtained, because such a previous roasting with an amount of air less than the stoichiometrically required amount, according to our studies does not make it possible to reach the wanted temperatures; 700° C. is hardly reached, so that the method presents the same chemical thermal troubles as shown with respect to (a). Furthermore, when a larger amount of sulphur than only the above mentioned labile sulphur is burnt in order to raise temperature, the arsenic in the bed will no longer be removed because it will form an arsenate, under such conditions, in a like way as occurs in the single turbulence beds:

(1) $As_2O_2 + 3Fe_3O_4 \rightarrow$
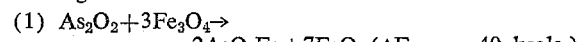
$2AsO_4Fe + 7FeO \quad (\Delta F_{800} = -40 \text{ kcals.})$ (2) $As_2O_3 + 0.9Fe_3O_4 + 0.7SO_2 \rightarrow$
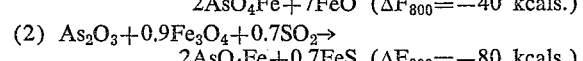
$2AsO_4Fe + 0.7FeS \quad (\Delta F_{800} = -80 \text{ kcals.})$ We have found that if ferrous sulphide which results from the total or partial removal of the labile sulphur in pyrites (which is accomplished by distillation or by combustion with a lower amount of oxygen than the stoichiometrically required amount) is heated higher than 700° C. in a non-oxiding atmosphere mainly constituted by sulphur dioxide, or by sulphur dioxide and nitrogen, a fast and complete removal of the arsenic not removed together with the labile sulphur is achieved, and removal of lead is also obtained in the same way. According to our own experience, the removal processes are such that both the rates of arsenic removal and of lead removal by this treatment depend on the working conditions under which the labile sulphur is removed from pyrites, in such a way that the removal of these elements down to their last traces is possible to be performed by means of this treatment of our invention, only when a sufficiently long residence time is maintained.

We have also found that the addition of certain solids considerably hastens the rates of removal, and, as a consequence, shorter residence times are thus required. According to our experiences, the manganese salts and oxides behave as catalytic agents both pure or mixed together with magnesium salts.

Figure 2:
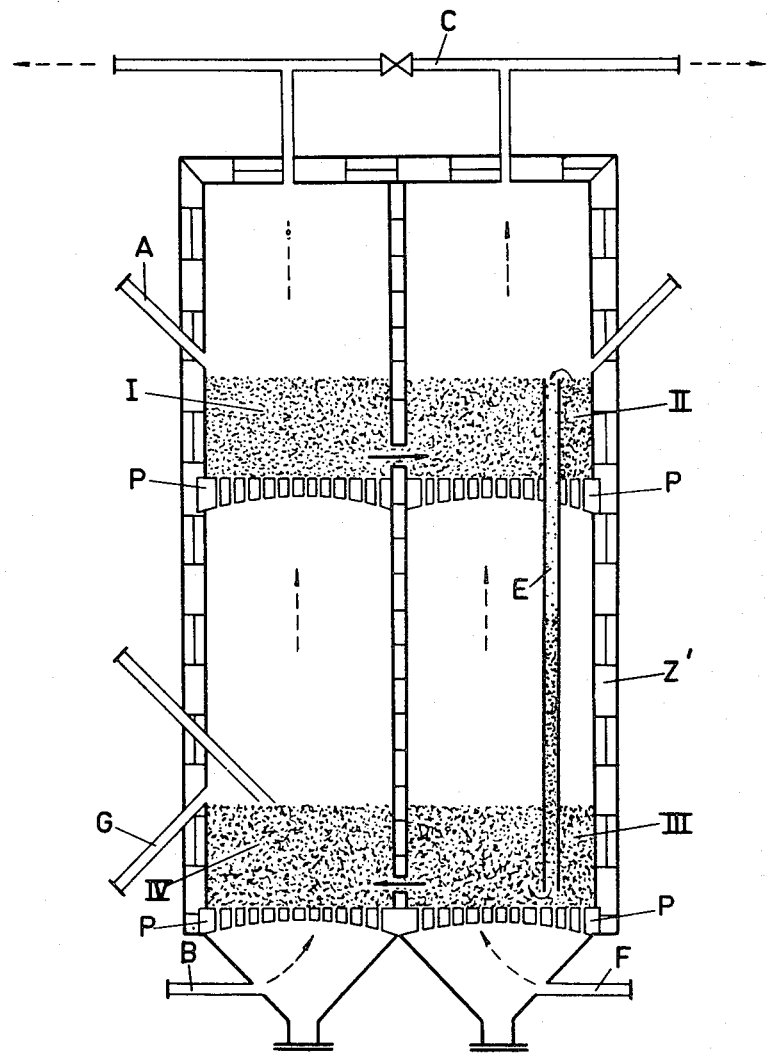

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic, elevational view in cross section of one embodiment of a fluidized bed furnace which may be utilized for carrying out the method of the present invention; and FIG. 2 is a schematic, elevational view in cross section of another embodiment of a fluidized bed furnace for carrying out the present method.

The two following examples of carrying out our invention are now described for a better understanding of the scope and size of our process. Without limiting the invention to the specific detail of the examples. The examples will also serve for a more detailed description of the drawing.

*Example I*

An amount of 100 kg. per hour of arsenic-bearing pyrites whose composition is

| | Percent |
|---|---|
| Sulphur | 45.5 |
| Iron | 41.5 |
| Arsenic | 2.6 |
| Lead | 2.0 |
| Other elements and insoluble matter | 8.4 |
| | 100.0 | is fed through inlet A into the furnace Z shown in FIG. 1 of the drawing which furnace comprises three fluidized beds, namely two upper beds I and II and lower bed III. The grain size of pyrites is about 2 mm.

A stream of 65 normal m.$^3$/hr. of air is blown through inlet B and, after crossing upwards through distribution grill P will serve to maintain the charge of solids in fluidized state. Under such conditions of work, a temperature of about 650° C. is obtained in beds I and II, so that the combustion of a part of the original pyrite sulphur will take place; the resulting gases leave the furnace through openings in the top thereof together with the powder being carried along which is composed of an amount of 10% of the fed solids, and are withdrawn through conduit C.

The composition of the exit gases is as follows:

| | |
|---|---|
| Sulphur dioxide | 20%. |
| Nitrogen | 80%. |
| Arsenic | 29 gr./m.$^3$ (in form of As$_2$S$_2$) |
| Lead | 6 gr./m.$^3$ |

An amount of 70 kg./hr. of solid residuum remains in bed I, the composition of this solid being as follows:

| | Percent |
|---|---|
| Sulphur | 33.4 |
| Iron | 53.3 |
| Arsenic | 0.8 |
| Lead | 2.0 |
| Other elements and insoluble matter | 10.5 |
| | 100.0 |

The solids pass through a side-pipe indicated by an arrow into bed II, wherein they enter in a direct fluidized contact with the hot roasting gases which arrive from lower bed III in an amount of 115 normal m.$^3$/hr. and whose composition is:

| | Percent |
|---|---|
| Sulphur dioxide | 14.2 |
| Nitrogen | 85.8 |

Under such conditions, a remarkable removal of both the arsenic and the lead still remaining from bed I takes place, so that a solid residue gradually falls into bed III, which has the following composition:

| | Percent |
|---|---|
| Sulphur | 34.22 |
| Iron | 54.8 |
| Arsenic | 0.02 |
| Lead | 0.06 |
| Other elements and insoluble matter | 11.0 |

The solids then reach bed III, through pipe E and enter into direct fluidized contact with a stream of 125 normal m.$^3$/hr. of air, which is previously blown in through pipe F.

The operating conditions in bed III are in such a way regulated that temperatures as high as 900° C. are reached.

60 kg./hr. of cinders leave the furnace through outlet G. These cinders contain 62% iron and 2% sulphur, and only amounts lower than 0.02% of arsenic and lower than 0.05% of lead, so that they are suitable for use in any further and conventional sideurgical purposes.

*Example II*

The treatment is similar to the one shown in Example I; the difference is based upon the fact that in Example II, as shown in FIG. 2, an additional fluidized bed has been included in furnace Z'. This bed IV serves for improving the removal conditions for arsenic and lead in bed I in such a way that the removing action in bed II need not be so thorough.

Furthermore, the cinders leaving bed IV are bearing the valuable metals zinc and copper, in the form of sulphates, which may be lixiviated.

100 kg./hr. of fresh pyrites having a composition of:

| | Percent |
|---|---|
| Sulphur | 46.0 |
| Iron | 42.3 |
| Arsenic | 0.8 |
| Lead | 1.3 |
| Zinc | 1.4 |
| Copper | 0.9 |
| Other elements and insoluble matter | 7.3 |
| | 100.0 | and an average grain size of about 2 mm. are fed through A into bed I of a furnace Z' shown in FIG. 2.

A stream of 125 normal m.$^3$/hr. of gases arriving from bed IV passes in through a grill P into bed I.

The composition of the gases is the following:

| | Percent |
|---|---|
| Sulphur dioxide | 5.5 |
| Oxygen | 11.1 |
| Nitrogen | 83.4 |

These gases keep the bed of solids in fluidized state and due to their oxidizing nature they promote the combustion of part of the pyritic sulphur in the said bed, wherein a temperature of about 700° C. is maintained by means of an adequate cooling which will serve to dissipate part of the heat of the reaction. An initial removal of both arsenic and lead takes place and a stream of 125 normal m.$^3$/hr. of resulting gases leaves the bed through an upper duct C together with the powder being carried along which consists of an amount of 10% of the total introduced solids. The composition of the exit gases is as follows:

| | |
|---|---|
| Sulphur dioxide | 16.6%. |
| Nitrogen | 83.4%. |
| Arsenic | 4.5 gr./m.$^3$ (in form of As$_2$S$_2$). |
| Lead | 2.1 gr./m.$^3$ |

A solid pyrrhotitic residuum in amount of 71.5 kg./hr. remains in the bed, its composition being the following:

| | Percent |
|---|---|
| Sulphur | 33.0 |
| Iron | 53.3 |
| Arsenic | 0.30 |
| Lead | 1.30 |
| Zinc | 1.76 |
| Copper | 1.13 |
| Other elements | 9.2 |

These solids are led through a side-duct, indicated by an arrow, into bed II where they enter in fluidized contact with an amount of 100 normal m.$^3$/hr. of roasting gases arriving from lower bed III and whose composition is as follows:

| | Percent |
|---|---|
| Sulphur dioxide | 14.1 |
| Nitrogen | 85.9 |

The temperature resulting in the bed is about 850° C., so that a fair complete removal, in volatile state, of the remaining arsenic and lead from bed I takes place, these elements being driven off together with the exit gases, which therefore contain these elements in the following amounts:

Arsenic _____ 2.1 gr./normal m.³ (in form of $As_2S_2$).
Lead _____ 9.3 gr./normal m.³

The solid residuum flows through duct E down into bed III, where a fluidized roasting takes place in contact with a limited amount of air (107 normal m.³/hr.) supplied through conduit F in such a way that cinders are obtained which consist mainly of $Fe_3O_4$ and whose composition is:

| | Percent |
|---|---|
| Sulphur | 5.68 |
| Iron | 61.0 |
| Arsenic | 0.01 |
| Lead | 0.04 |
| Copper | 1.3 |
| Zinc | 2.0 |
| Other elements | 10.5 |

These solids go on through a lower duct indicated by an arrow into side bed IV where a fluidized sulphating roasting takes place in contact with 128.4 normal m.³/hr. of gases supplied through conduit B, and whose composition is:

| | Percent |
|---|---|
| Sulphur dioxide | 4.0 |
| Oxygen | 15.0 |
| Nitrogen | 81.0 |

These gases are formed of 92 normal m.³/hr. of air mixed together with 36.4 normal m.³/hr. of gases recycled from bed II. Under such conditions, $Fe_3O_4$ is oxidized to $Fe_2O_3$, the remaining sulphur in the cinders is drained off, and the copper and zinc present are change into soluble sulphates. The bed is maintained at a temperature of about 650° C.

The exit gases flow into bed I as has been shown and described further above.

66 kg. of ferric cinders, which include their original copper and zinc content in the form of sulphates, leave through duct G and are suitable to be lixiviated so that the predominantly iron-containing fraction thereof may be used as an addition to a charge for blast-furnaces, in order to make good use of their iron content.

The final composition of these cinders is as follows:

| | Percent |
|---|---|
| Iron | 57.5 |
| Sulphur | ¹1.55 |
| Copper | ¹1.22 |
| Zinc | 1.9 |
| Arsenic | <0.01 |
| Lead | <0.03 |
| Other elements and insoluble matter | 9.9 |

¹ In the form of sulphate.

What is claimed as new and desired to be secured by Letters Patent is:

1. The treatment of arsenic-containing pyrite ore for the recovery of sulfur and of a substantially arsenic-free residue suitable for conversion into ferrous metal, which comprises subjecting said arsenic-containing pyrite ore in fluidized condition to partial oxidation in a stream of oxygen-containing gas the oxygen content of which is at most equal to the amount of oxygen required for oxidation of the labile sulfur of said arsenic-containing pyrite so as to oxidize only labile sulfur thereby reducing the total sulfur content of said pyrite; heating the thus obtained pyrite ore of reduced sulfur content in fluidized condition in a stream of hot nonoxidizing gas so as to separate arsenic therefrom and to form a residual ore substantially free of arsenic; and roasting the thus obtained residual ore in fluidized condition in an oxidizing gas so as to oxidize at least the major portion of sulfur contained in said substantially arsenic-free ore and simultaneously to form an ore residue consisting of iron oxides substantially free of arsenic and suitable for direct conversion into ferrous metal.

2. The treatment of arsenic-containing pyrite ore for the recovery of sulfur and of a substantially arsenic-free residue suitable for conversion into ferrous metal, which comprises subjecting said arsenic-containing pyrite ore in fluidized condition to partial oxidation in a stream of oxygen-containing gas the oxygen content of which is at most equal to the amount of oxygen required for oxidation of the labile sulfur of said arsenic-containing pyrite so as to oxidize only labile sulfur and forming a gas containing sulfur dioxide and arsenic sulfide thereby reducing the total sulfur and arsenic content of said pyrite; heating the thus obtained pyrite ore of reduced sulfur and arsenic content in fluidized condition in a stream of hot nonoxidizing gas so as to separate arsenic therefrom and to form a residual ore substantially free of arsenic; and roasting the thus obtained residual ore in fluidized condition in an oxidizing gas so as to oxidize at least the major portion of sulfur contained in said substantially arsenic-free ore and transforming said oxidizing gas into a substantially non-oxidizing gas, thereby forming an ore residue consisting of iron oxides substantially free of arsenic and suitable for direct conversion into ferrous metal.

3. A method according to claim 2, wherein said arsenic-containing pyrite also contains lead, and said lead is substantially removed together with arsenic during the heating of the pyrite ore of reduced sulfur content in said stream of hot non-oxidizing gas.

4. A method according to claim 2, wherein partial oxidation of said pyrite ore is carried out in a stream of oxygen-containing gas the oxygen content of which is substantially equal to the amount of oxygen required for oxidation of the labile sulfur of said pyrite ore.

5. A method according to claim 2, wherein said oxidizing gases are air.

6. A method according to claim 2, wherein at least a portion of said non-oxidizing gas formed by roasting said residual ore is utilized for forming said stream of hot non-oxidizing gas.

References Cited in the file of this patent

UNITED STATES PATENTS

| 900,453 | Wadhams et al. | Oct. 6, 1908 |
| 2,650,159 | Tarr et al. | Aug. 25, 1953 |
| 2,847,281 | Ortuno et al. | Aug. 12, 1958 |
| 2,867,526 | Heath et al. | Jan. 6, 1959 |
| 2,889,203 | Pfannmueller et al. | June 2, 1959 |